Patented Oct. 27, 1953

2,657,221

UNITED STATES PATENT OFFICE 2,657,221

VAT DYESTUFF

Jacob Koch, Basel, and Walter Kern, Sissach, Switzerland, assignors to Ciba Limited, Basel, Switzerland, a Swiss firm No Drawing. Application May 22, 1950, Serial No. 163,571. In Switzerland July 21, 1949

1 Claim. (Cl. 260—368)

According to this invention a valuable vat dyestuff is made by reacting 1 mol of 1:8-dibenzoylamino-4:5-diaminoanthraquinone with 2 mols of anthraquinone containing a halogen atom in the 2-position. The 1:8-dibenzoylamino-4:5-diaminoanthraquinone used as starting material may be prepared by dinitrating the oxamic acid of 1:8-diaminoanthraquinone, splitting off the oxalic acid radicals, benzoylating the 2 amino groups in the 1- and 8-positions, and subsequently reducing the 2 nitro groups in the 4- and 5-positions.

For reacting the resulting starting material with anthraquinone containing a halogen atom in the 2-position there may be used, for example, 2-chloranthraquinone. The reaction is advantageously conducted in the presence of a high boiling acid-binding agent or inert diluent, such as nitrobenzene or naphthalene, preferably with the addition of a catalyst known to favor the formation of anthrimides, such as copper or copper salts, at a raised temperature.

An alternative process for making the same dyestuff consists in treating 4:5-di-(β-anthraquinonyl)-amino-1:8-diaminoanthraquinone with a benzoylating agent.

The starting material required for this alternative process can be made by reacting 1 mol of 4:5-diamino-1:8-dinitroanthraquinone with 2 mols of a β-halogen anthraquinone, and subsequently reducing the nitro groups. The benzoylation can be carried out, for example, by means of benzoyl chloride in a high boiling solvent or diluent.

The 1:8-dibenzoylamino-4:5-di-(β-anthraquinonyl)-aminoanthraquinone obtainable by this invention is a valuable vat dyestuff which is distinguished, more especially, by an excellent fastness to light and also by good general properties of fastness. It is suitable for dyeing or printing a very wide variety of fibers, especially cellulose fibers, such as cotton, linen, and artificial silk and staple fibers of regenerated cellulose.

The following examples illustrate the invention, the parts being by weight unless otherwise stated and the relationship of parts by weight to parts by volume being the same as that of the kilogram to the liter:

Example 1

16.4 parts of finely powdered 1:8-diamino-4:5-dinitroanthraquinone are heated in 492 parts of nitrobenzene to 195° C., while stirring. 15.5 parts of benzoyl chloride are added and stirring is continued for one hour while boiling gently. After cooling the whole to room temperature, the dibenzoyl compound which has separated in the form of yellow platelets is separated by filtering with suction, washed with nitrobenzene and with alcohol, and then dried. It melts at about 376-8° C. The yield amounts to 80-85 per cent. of the theoretical yield.

27 parts of the resulting 1:8-dibenzoylamino-4:5-dinitroanthraquinone are finely pulverized and heated to about 90° C. in 486 parts of nitrobenzene. 12 parts of hydrazine hydrate (95 per cent. pure) are added, whereupon the reaction mixture immediately becomes blue, and the whole is stirred for one hour at 90-100° C. After a further addition of 6 parts of hydrazine hydrate, the whole is stirred at 100-110° C. for one hour longer.

The 1:8-dibenzoylamino-4:5-diaminoanthraquinone, which crystallizes in the form of blue needles, is separated by filtering the mixture with suction while hot, and washed with nitrobenzene and with alcohol and then dried. The yield amounts to 85-90 per cent. of the theoretical yield.

In a finely powdered state 14.3 parts of 1:8-dibenzoylamino-4:5-diaminoanthraquinone, 16 parts of 2-chloranthraquinone, 6 parts of anhydrous sodium acetate, 3 parts of magnesium oxide and 2 parts of cuprous chloride are mixed with 190 parts of naphthalene. The mixture is heated and the melt is stirred while gently boiling until the starting materials have disappeared. The whole is then allowed to cool to 150° C., it is diluted with 120 parts of monochlorobenzene, and stirred for one hour at 140-150° C. After being cooled to about 90° C., the mixture is filtered with suction. The residue is purified by treating it in turn with monochlorobenzene, alcohol, dilute hydrochloric acid and water, and then dried. The yield amounts to 70-80 per cent. of the theoretical yield.

The dyestuff is a green-blue powder which dissolves in concentrated sulfuric acid with a pure blue coloration. It dyes cotton from a red-brown vat bluish olive green tints having excellent properties of fastness.

Example 2

In a finely powdered condition 16.4 parts of 1:8-diamino-4:5-dinitroanthraquinone, 29.1 parts of 2-chloranthraquinone, 10.6 parts of anhydrous sodium carbonate, 5 parts of magnesium oxide and 3 parts of cuprous chloride are mixed with 230 parts of naphthalene. The mixture is heated and the melt is stirred while gently boiling until the starting materials have disappeared. The whole is then allowed to cool to 160° C., and is diluted with monochlorobenzene and worked up in the manner described in the third paragraph of Example 1. The yield amounts to about 60-70 per cent. of the theoretical yield.

22.2 parts of the resulting 1:8-dinitro-4:5-di-(2'-anthraquinonyl)-aminoanthraquinone in a finely powered condition are heated in 400 parts of nitrobenzene to about 100-110° C. There are added at first 8 parts and after one hour a further 4 parts of hydrazine hydrate (95 per cent. pure), and the product is worked up in the manner described in the second paragraph of Example 1. The yield amounts to 90-95 per cent. of the theoretical yield.

13.6 parts of finely powdered 1:8-diamino-4:5-di-(2'-anthraquinonyl)-aminoanthraquinone are heated in 400 parts of nitrobenzene to 195° C., while stirring. 7 parts of benzoyl chloride are added, and the whole is stirred for one hour while gently boiling. After cooling, the mixture is filtered with suction, and the residue is washed with nitrobenzene and with alcohol and then dried. The yield amounts to about 70 per cent. of the theoretical yield. The dyestuff so obtained has properties substantially identical with those of the product obtained as described in the third paragraph of Example 1.

It is obvious that the products obtained by either of the above processes are contaminated by slight amounts of impurities, and it is further obvious that these impurities are different depending on the process used. This may result in a slightly different appearance of the products of the two processes and even of the dyeings made therewith, but nevertheless the products are essentially the same.

*Example 3*

1.5 parts of the vat dyestuff obtained as described in Example 1 are vatted at about 50° C. and with 6 parts by volume of caustic soda solution of 36° Bé. and 3 parts of sodiumhydrosulfite in 300 parts of water. The stock vat so prepared is added to a dyebath containing in 1700 parts of water 4 parts by volume of caustic soda solution of 36° Bé. and 2 parts of sodium hydrosulfite, and then 100 parts of cotton are entered into the bath at 40° C. 20 parts of sodium chloride are added after 15 minutes and dyeing is carried on at 40-50° C. for one hour. The cotton is then squeezed, oxidized in the air, rinsed, acidified, again rinsed and, if desired, soaped at the boil. The cotton is dyed a fast bluish-olive green tint.

What we claim is:

The vat dyestuff of the formula

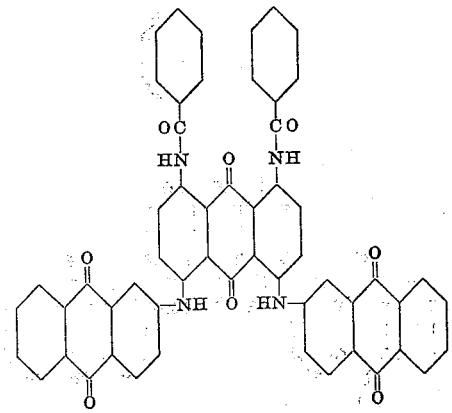

JACOB KOCH.
WALTER KERN.

References Cited in the file of this patent

UNITED STATES PATENTS

| Number | Name | Date |
|---|---|---|
| 2,205,855 | Kuppe | June 25, 1940 |

FOREIGN PATENTS

| Number | Country | Date |
|---|---|---|
| 25,986 | Great Britain | of 1909 |
| 206,728 | Switzerland | Aug. 1939 |